March 15, 1938.  C. C. STEENSGAARD  2,111,463

MECHANICAL FORCE FEEDER FOR FOOD CHOPPERS AND GRINDERS

Filed June 15, 1936

Carl C. Steensgaard, INVENTOR.

BY Victor J. Evans & Co.

ATTORNEYS

Patented Mar. 15, 1938

2,111,463

UNITED STATES PATENT OFFICE 2,111,463

MECHANICAL FORCE FEEDER FOR FOOD CHOPPERS AND GRINDERS

Carl C. Steensgaard, De Smet, S. Dak., assignor of one-half to Dakota Theodore Smith, De Smet, S. Dak.

Application June 15, 1936, Serial No. 85,365

1 Claim. (Cl. 146—182)

This invention relates to power driven feeders for food choppers and grinders and has for the primary object the provision of a simple and inexpensive device of this character which may be readily adapted to a food grinder or chopper now in use and is driven by the same power employed for driving the grinder or chopper and will efficiently feed the food into the latter and eliminate hand feeding and the danger of injury to the operator besides providing a time saving device.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a food grinder equipped with a feeder constructed in accordance with my invention.

Figure 1:
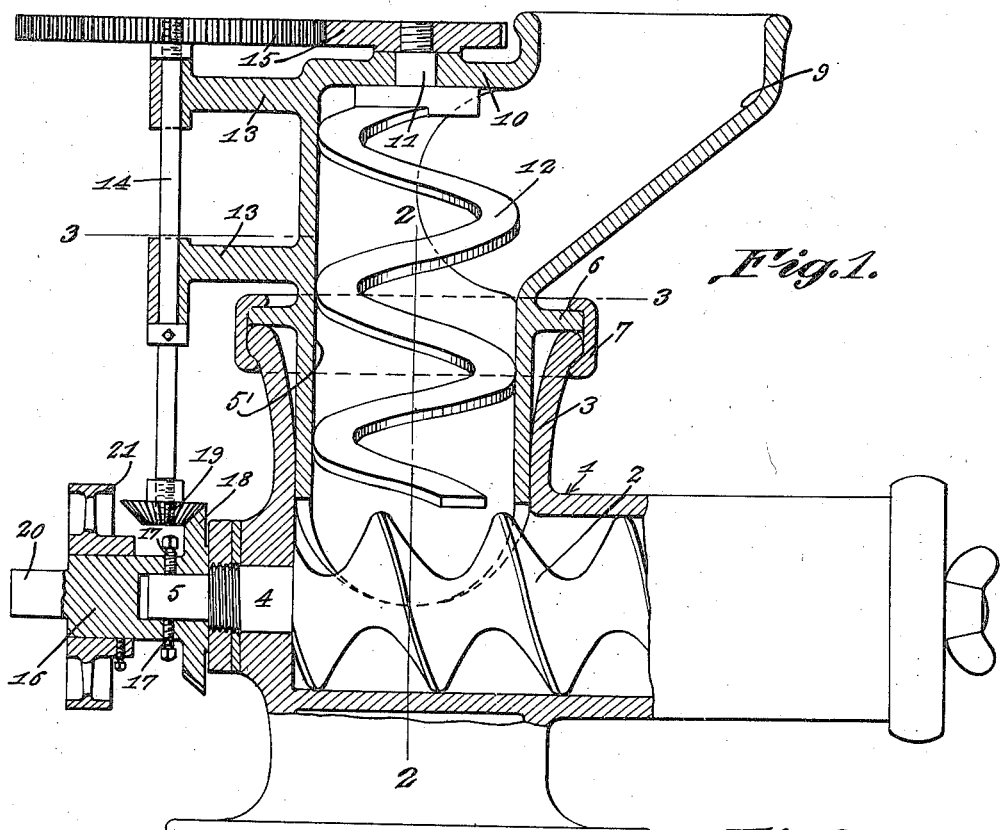
Figures 2, 3:
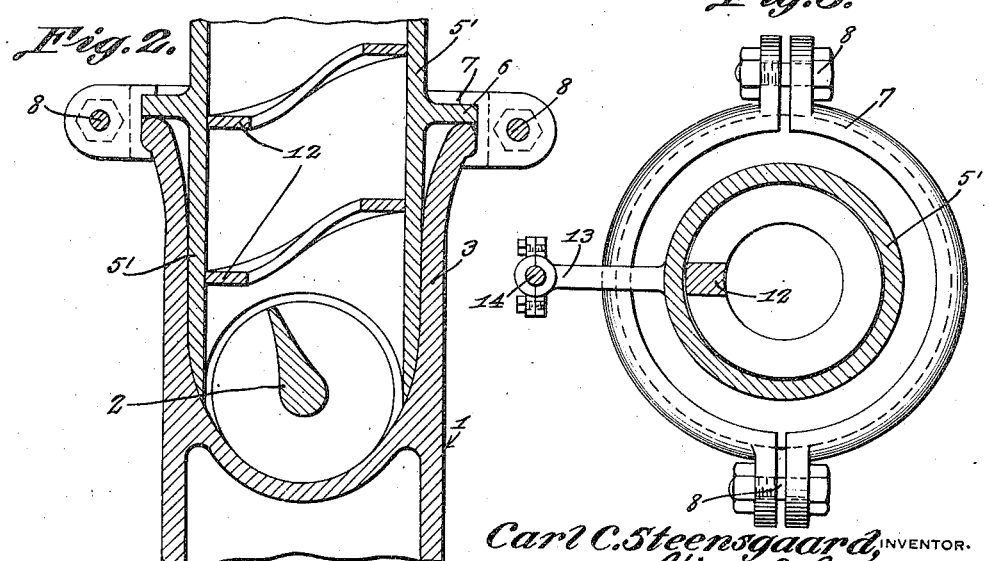
Figure 2 is a sectional view taken on the line 2—2 of Figure 1.
Figure 3 is a sectional view taken on the line 3—3 of Figure 1.

Referring in detail to the drawing, the numeral 1 indicates a conventional type of food grinder including the usual worm feed 2 and hopper 3. The forward end of the worm feed 2 is in the form of a shank 4 extending exteriorly of the grinder and provided with angularly related faces 5 to be engaged by the usual crank handle or power pulley if the grinder is power driven. A grinder of this character requires that the food be fed to the spiral feeder by hand endangering the operator and also requiring a considerable amount of manual attention and further requiring considerable amount of time in which to grind a particular amount of food. To eliminate the disadvantages of waste of time and the danger of injury to the operator my invention may be readily adapted to the grinder and consists of a cylinder 5' which extends into the hopper 3 and is equipped with a flange 6 adapted to rest on the edge of the hopper 3. A sectional clamp 7 is employed for detachably securing the flange 6 to the hopper and is of channel formation and the sections detachably connected by bolts 8. The cylinder 5' extends a considerable distance above the hopper 3 and has formed integrally therewith a hopper 9 feeding into the cylinder 5' from one side thereof. The upper end of the cylinder 5' is closed by a wall 10 apertured to form a journal for a shaft 11. The shaft 11 has secured thereto a spiral feeder 12 which terminates adjacent the lower end of the cylinder and in close proximity to the feeder 2.

Brackets 13 are formed on the cylinder and provide journals for a shaft 14. The shaft 14 is connected to the shaft 11 by gears 15.

A fitting 16 is socketed and has the walls of the socket shaped to fit the faces of the reduced end 5 of the shank 4. Set bolts 17 are employed for detachably securing the fitting 16 to the shank 4. The fitting 16 includes a gear 18 which meshes with a gear 19 secured to the shaft 14. A shank 20 forms an integral part of the fitting to which a handle may be adapted. Also a power pulley 21 is secured to the fitting 16 whereby the device may be actuated manually or by power from a motive source (not shown).

From the foregoing description it will be seen that the spiral feeder 12 is rotated at the same time as the feeder 2 and the food is placed in the hopper 9 and the feeder 12 carries the food downwardly to the feeder 2 and the latter carries said food to the usual grinding mechanism.

While I have described my invention as adapted to a food grinder it is to be understood that the same may be used also in connection with a food chopper or similar device.

Having described the invention, I claim:

A feeder for food grinders comprising a cylinder to extend into a hopper of a grinder, a flange formed on the cylinder and resting on the hopper to limit the movement of said cylinder into the grinder and for supporting one end of the cylinder in close proximity to a worm feeder of the grinder, a sectional clamp engaging the flange and the hopper, said cylinder having a portion thereof enlarged and disposed laterally to form a hopper, said cylinder having one end closed by a wall, a shaft rotatably supported by the wall, a spiral feeder secured on the shaft and arranged in the cylinder to receive food from the second mentioned hopper and force the food into the worm feeder of the grinder, brackets formed on the cylinder, and a second shaft rotatably supported by the brackets and geared to the first shaft and to the grinder.

CARL C. STEENSGAARD.